United States Patent [19]

Neville

[11] 4,268,490

[45] May 19, 1981

[54] PROCESSES OF MAKING PRILLED AMMONIUM NITRATE COMPOSITIONS

[75] Inventor: Robert S. Neville, Merewether Heights, Australia

[73] Assignee: ICI Australia Limited, Victoria, Australia

[21] Appl. No.: 57,004

[22] Filed: Jul. 12, 1979

Related U.S. Application Data

[63] Continuation-in-part of Ser. No. 921,515, Jul. 3, 1978, abandoned.

[51] Int. Cl.$^3$ .............................................. C01C 1/18
[52] U.S. Cl. ...................................... 423/266; 23/300; 71/59; 71/60; 71/64 D; 423/396
[58] Field of Search ........................... 71/59, 60, 64 D; 23/300; 423/266, 296

[56] References Cited

U.S. PATENT DOCUMENTS

| | | | |
|---|---|---|---|
| 3,148,946 | 9/1964 | Griffith | 71/60 X |
| 3,282,674 | 11/1966 | Mohr | 71/59 X |
| 3,953,192 | 4/1976 | Hodgson et al. | 149/46 |

FOREIGN PATENT DOCUMENTS

| | | | |
|---|---|---|---|
| 1909426 | 9/1969 | Fed. Rep. of Germany | 71/59 |
| 2456274 | 10/1975 | Fed. Rep. of Germany | 423/396 |

Primary Examiner—Leland A. Sebastian

[57] ABSTRACT

An improved process for the manufacture of ammonium nitrate prills and granules in which a water soluble aluminium salt is added to the process stream prior to the concentrate, which is then used in the prilling or granulating process, being formed.

27 Claims, No Drawings

PROCESSES OF MAKING PRILLED AMMONIUM NITRATE COMPOSITIONS

This application is a continuation-in-part of prior U.S. application Ser. No. 921,515, filed July 3, 1978, now abandoned.

The present invention provides for an improved process of manufacture of ammonium nitrate prills and granules.

There are two types of ammonium nitrate prill which may be distinguished by their free flowing bulk densities. Those with a high density (free flowing bulk density > 0.85 g/ml) are generally used as fertilisers. Those with low densities (free flowing bulk density < 0.85 g/ml) are generally used in explosive compositions. The two types of ammonium nitrate prills may be made by variations of a process involving the reaction of nitric acid and ammonia to form a hot liquid comprising ammonium nitrate, the spraying of this hot liquid down a tower so that solid prills are formed and the cooling of the prills.

Low density ammonium nitrate prills are manufactured by reacting nitric acid with ammonia in a neutraliser, evaporating most of the water from the resulting ammonium nitrate solution in an evaporator to form a concentrate, causing the hot concentrate, containing typically between 1% and 6% water, from the evaporator to fall from the top of a prilling tower, and collecting, drying and cooling the prills so formed.

High density ammonium nitrate prills are manufactured by reacting nitric acid with ammonia in a neutraliser, evaporating the resulting ammonium nitrate solution in an evaporator to reduce the water content of the ammonium nitrate solution to less than 1% water to form a concentrate in the form of a melt, causing the hot melt from the evaporator to fall from the top of a prilling tower, and collecting and cooling the dry prills so formed. By dry we mean less than 0.2% $H_2O$ content.

Ammonium nitrate granules are made by preparing a hot concentrate of ammonium nitrate in the manner described for the manufacture of low density ammonium nitrate prills. This hot concentrate is added to recycled solid ammonium nitrate in a granulator in which granules are produced by agglomeration of the recycled solid ammonium nitrate and solidification of the concentrate. The granules are dried and screened. The granules of a size outside the desired product size are crushed and recycled to the granulator to provide the solid ammonium nitrate recycle.

In U.S. Pat. No. 3,639,643 it has been disclosed that the mechanical strength of ammonium nitrate prills and granules may be enhanced by preparing them so that they contain colloidal aluminium hydroxide; the aluminium hydroxide being formed by the addition of aluminium sulphate to the ammonium nitrate concentrate after the evaporation stage. High mechanical strength of the prills and granules manifests itself in high resistance to prill and granule breakdown during handling, to compaction and caking on storage, and to degradation during the temperature changes about the crystal phase transition temperature.

We have now found that, in the manufacture of ammonium nitrate prills and granules which contain aluminium compounds to impart high strength, it is advantageous to add an aluminium salt as a source of aluminium compounds to the reactants in the neutraliser or, at the latest, before the concentrate is formed.

We have observed that the drying characteristics of ammonium nitrate prills and granules made by a process in which an aluminium salt was added in the neutraliser were superior to those made without aluminium salt addition and to those made by a process in which the aluminium salt was added after the evaporation stage. Much less rigorous conditions of drying are required. Although this benefit is more significant in the manufacture of low density prills and granules, it also helps in the drying of high density prills during the prilling process. Less rigorous drying conditions mean that less prill attrition is likely to occur and less prill tower fume will form. Prill tower fume is the phenomenon of the carry over of very fine solid particles of ammonium nitrate entrained in the gases passed through the prill tower.

Another advantage lies in the better control of pH which may be achieved throughout the whole process. Ideally the neutraliser is operated by titrating the ammonia and nitric acid to form the composition which is obtained by the reacting of stoichiometric amounts of these reactants, that is ammonia ($NH_3$) and nitric acid ($HNO_3$) in a molecular ratio of 1:1; to pH value of this composition is 3.9 and it is referred to as the equivalence point. (Throughout this specification and claims, unless otherwise stated, pH values are those of an aqueous solution derived from the composition in question diluted or dissolved in water so that the solution so formed contains approximately 10% w/w of ammonium nitrate, the pH measurement being made with a conventional pH meter at room temperature.) However, because of the steep nature of the ammonia-nitric acid neutralisation curve it is impossible to control the addition of the reactants to the neutraliser and maintain the contents at the equivalence point. For safety reasons most neutralisers are operated on an excess of ammonia with a consequently high pH. Typically a neutraliser is run so that its contents have a pH value of 5.2 to 5.5, below that pH range it is difficult to control the reaction in a stable manner. However, we have now found that if an aluminium salt is added to the reactants in the neutraliser, stable control can be achieved at a lower pH, for example as low as 4.6. One advantage of this is that the amount of ammonia slip at the subsequent evaporation stage is reduced. During the concentration of the hot ammonium nitrate solution ammonia is also removed with the water from the solution until the stoichiometric equivalence point is reached and the pH value of the concentrate drops to 3.9. Therefore the lower the pH value at which the neutraliser may be operated, the less the ammonia slip from the evaporator and the less ammonia which has to be scrubbed from the effluent and recycled. However the process of the present invention may be carried out using any desired pH profile throughout the process including those conventionally used. Conveniently the pH value of the solution in the neutraliser may be in the range of 4.2 to 5.5 inclusive without significantly affecting the aforesaid advantages which accrue in the drying operations when the process of the invention is used.

Another advantage accruing by adding aluminium salts prior to the evaporation stage rather than later in the process is that the pH value of the concentrate from the evaporator is not affected. For example, when aluminium sulphate is added to the concentrate from the evaporator, the pH of that concentrate may be reduced to below 3.0. This means extra ammonia has to be added to raise the pH to the desirable level for prilling or granulating, which is typically 4.0 to 5.0 for low density prills and granules, and 5.0 to 6.0 for high density prills.

Accordingly there is provided an improvement in the process for the manufacture of prilled or granulated material comprising ammonium nitrate which process comprises manufacture of a solution of ammonium nitrate by the reaction of ammonia and nitric acid in a neutraliser, concentration of said solution by evaporation to the concentration required for prilling or granulating, and subjecting the thus formed concentrate to a prilling or granulating process to form prills or granules which are optionally dried and cooled, the said improvement comprising the addition of at least one water soluble aluminium salt to the said solution of ammonium nitrate prior to the completion of the concentration stage.

The said process may be carried out batchwise, continuously or semicontinuously.

The actual aluminium compound present in the ammonium nitrate solution, concentrate, prill or granule, depending on the stage of the process, is difficult to identify. However, it has been found that the benefits already describe as accruing from the present invention may be achieved by adding a water-soluble aluminium salt to the said solution of ammonium nitrate. However, as it is undesirable to have halides present, even in small amounts, in ammonium nitrate manufacturing processes, aluminium halides are specifically excluded from our invention. Suitable water soluble aluminium salts may be selected from the sulphates such as aluminium sulphate, and sodium aluminium sulphate—preferably aluminium sulphate is used. Aluminium nitrate is also suitable.

It is preferred to add the water soluble aluminium salt as an aqueous solution. For example, a convenient form of solution to use is that commonly employed in water treatment, i.e. an aqueous solution of aluminium sulphate containing 7.5% of aluminium sulphate expressed as $Al_2O_3$ and a free sulphuric acid content of 0.5% $H_2SO_4$ both expressed on a w/w basis.

The process of our invention involves the addition of water soluble alumiinium salts so that the final product prills contain at least 100 parts by weight of aluminium compounds (expressed as $Al_2O_3$) per million parts by weight of ammonium nitrate. Preferably the level of addition is between 800 and 2000 parts by weight per million parts by weight of ammonium nitrate.

It is preferred in the present invention to derive only part of the desired content of aluminium compounds in the prilled or granulated material by addition of an aluminium salt to the solution of ammonium nitrate prior to evaporation. The remainder required to give the desired content of aluminium compounds in the prilled or granulated products may be added at any convenient stage in the process stream afer the evaporation stage. It is preferred that at least 20% by weight of the total weight of aluminium added is added to the process reactant stream prior to the concentrate being formed.

Accordingly there is provided in a preferred embodiment of the present invention a process for the manufacture of prilled or granulated ammonium nitrate, as hereinbefore described, wherein, in a first addition, at least one water soluble aluminium salt is added to the said solution of ammonium nitrate prior to the said concentration being formed and wherein, in a second addition, at least one water soluble aluminium salt is added to the said process stream after said concentrate has been formed.

Conveniently the water soluble aluminium salt added in the second addition may be selected from the following group:
  Aluminium sulphate
  Aluminium nitrate
Double Aluminium salts, such as:
  Ammonium aluminium sulphate
  Sodium aluminium sulphate
  Potassium aluminium sulphate
Aluminates, such as:
  Sodium aluminate
  Potassium aluminate Preferably aluminates are used because they do not depress the pH value of the concentrate when they are added to it and thus the amount of ammonia which has to be added to the concentrate to adjust its pH value to the desired value for the prilling or granulating process is reduced.

It is generally more convenient to add the aluminium salt in the second addition as an aqueous solution but in some circumstances, such as in the manufacture of high density prills, it is better to add the salts as solids because less additional water is introduced thereby.

The process of the invention may be carried out such that the pH value in the solution of ammonium nitrate formed by the reaction of ammonia and nitric acid is in a range from 4.2 to 5.5 inclusive. Preferably it is in a range from 4.6 to 5.0 inclusive.

In another preferred embodiment of the invention ammonium nitrate prills or granules are manufactured by a continuous process wherein the solution of ammonium nitrate is made continuously by the reaction of ammonia and nitric acid in a preformed solution of ammonium nitrate and wherein a water soluble aluminium salt is added continuously to the ammonium nitrate solution before it is concentrated to the degree that it is suitable for prilling or granulating.

In this preferred embodiment involving a continuous process the rates of addition of ammonia and nitric acid are controlled so that the pH value of the solution of ammonium nitrate is maintained in the range of 4.2 to 5.5 inclusive, preferably in the range of 4.6 to 5.0 inclusive.

The term "continuous" and its derivatives are used in this specification to identify the mode of operation as being distinct from "batchwise".

Although the subsequent benefits in respect to drying will be obtained if the aluminium is added at any stage before the concentrate, i.e. a solution or melt containing not more than 6% w/w of water, is formed, the benefits, hereinbefore described, will only be enjoyed to the full if the addition is made during the reaction stage. Therefore it is a preferred feature of this invention that the pre-evaporator addition of the aluminium compound is made to the neutraliser in which the nitric acid is being re-acted with ammonia. It is preferred that the addition is made to the neutraliser so that the aluminium compounds are introduced into a reactant medium of pH between 4.2 and 5.5, more preferably between 4.6 and 5.0.

When the process of the invention is carried out in the preferred continuous mode the water soluble aluminium salt may be added continuously to the neutraliser concurrently with the addition of the nitric acid and ammonia. Preferably the aluminium salt is added direct to the preformed solution of ammonium nitrate in an amount which will cause the solution of ammonium nitrate to have a content of aluminium compounds in an amount in the range from 100 to 2000 parts by weight, expressed as $Al_2O_3$, per million parts of ammonium nitrate, expressed as $NH_4NO_3$, contained in the said solution.

In some circumstances, particularly in manufacturing complexes in which a number of different products are being manufactured from a common stream of ammonium nitrate solution, it is more convenient to add the aluminium salt to a holding tank of ammonium nitrate solution which is destined to be used in the process of this invention.

In these circumstances, the ammonium nitrate solution from the neutraliser may be partially concentrated by evaporation before it is introduced into the holding tank where the aluminium salt may be added. Concentration to the degree desired for prilling or granulating is then completed after extraction from the holding tank. Thus the aluminium salt may be added at any stage before the ammonium nitrate solution reaches the concentration required for prilling or granulating.

Our invention is now illustrated by, but is in no way limited to, the following examples 1, 2, 5, 8, and 9 wherein all parts and percentages are expressed on a weight basis unless otherwise specified.

EXAMPLE 1

This illustrates the process of the present invention as it was used for the manufacture of low density prills. Ammonium nitrate solution containing about 85% ammonium nitrate was made in a neutraliser by continuously adding nitric acid and gaseous ammonia to a preferred ammonium nitrate solution. Simultaneously aluminium sulphate, in the form of an aqueous solution prepared by dissolving 50 parts of $Al_2(SO_4)_3.18H_2O$ in 50 parts water, was added to the ammonium nitrate solution in the neutraliser in the proportion of 280 parts of aluminium sulphate (expressed as $Al_2O_3$) per million parts of ammonium nitrate formed (expressed as $NH_4NO_3$). The level of ammonia addition was controlled so that the pH of the solution in the neutraliser was maintained at a value between 5.2 and 5.4.

The solution from the neutraliser was concentrated in a falling film evaporator to form a concentrate containing 95% ammonium nitrate. The pH value of the solution fell during this evaporation process to 3.9 Gaseous ammonia was added to adjust the pH value of the concentrate in a range from 4.2 to 4.6. The concentrate was then prilled in a conventional prilling tower.

The prills were then dried to give a product having a moisture content in the range from 0.10 to 0.15% $H_2O$, as measured by the conventional Karl Fischer Test. The drying process was carried out in a conventional drying system comprising three rotating drying drums in series. The residence time in the drying system was 58 minutes and the amount of drying air used was 4.1 kg air per 1.0 kg of product in the form of prilled ammonium nitrate.

EXAMPLE 2

This example illustrates a further process of the present invention which was used to manufacture low density ammonium nitrate prills. A solution containing 85% ammonium nitrate was prepared in a similar manner to that used is example 1 except that aluminium sulphate in the form of an aqueous solution of aluminium sulphate, containing 7.5% of aluminium sulphate expressed as $Al_2O_3$ and a free sulphuric acid content of 0.5% $H_2SO_4$ both expressed on a w/w basis, was added to the ammonium nitrate solution in the neutraliser in the proportion of 600 parts of aluminium sulphate (expressed as $Al_2O_3$) per million parts of ammonium nitrate formed (expressed as $NH_4NO_3$). Ammonia was added so that the pH value of the ammonium nitrate solution in the neutraliser was in the range from 4.7 to 4.9.

The solution was evaported to form a concentrate containing 95% ammonium nitrate as in example 1, and a further 600 parts of aluminium sulphate (expressed as $Al_2O_3$) per million parts of ammonium nitrate present were added to the concentrate as a solution of the same concentration of aluminium sulphate as that added to the neutraliser. Gaseous ammonia was added to the concentrate prior to the addition of the aluminium sulphate so that the pH value of the concentrate after the addition of the aluminium salt was at least 4.2.

The concentrate was then prilled in a conventional prilling tower and the product prills were dried to a moisture content between 0.09 and 0.13% $H_2O$ as determined by the Karl Fischer test. The drying system used was the same as that used in Example 1. The residence time in the drying system was 58 minutes and the amount of drying air used was 3.9 kg air per 1.0 kg of product.

Example 3

By way of comparison this example illustrates the process of manufacturing low density ammonium nitrate prills containing aluminium compounds by a process in which an aluminium salt was added only to the concentrate. A solution containing 83% ammonium nitrate was prepared in a similar manner to that used in Example 1, but no aluminium sulphate was added. The minimum level of gaseous ammonia addition to give stable pH control was found to be that which produced a solution having a pH value in the range 5.2 to 5.4.

The solution was concentrated to give a concentrate containing 95% ammonium nitrate and having a pH value of 3.9. On the addition of 1000 parts of aluminium sulphate (expressed as $Al_2O_3$) per million parts of ammonium nitrate (expressed as $NH_4NO_3$) in the concentrate, the pH value dropped to below 2.0. Gaseous ammonia was added to increase the pH value of the concentrate to a suitable value before it was prilled under conventional prilling conditions.

The difficulty in drying the prills made in the manner just described, which is not according to the present invention, is shown by the fact that the product prills could not be dried below a moisture content, as determined by the Karl Fischer method, in the range 0.16% to 0.30% $H_2O$ using the same drying system as was used in examples 1 and 2 even with the maximum amount of drying air available, namely 4.5 kg air per 1.0 kg product.

Example 4

As a comparison this example illustrates the process of manufacturing low density ammonium nitrate prills without the addition of aluminium at any stage of the process. The steps of neutralising, evaporating, prilling and drying described in example 1 were followed, but at no stage was any aluminium compound added. The pH values at various stages of the process were
stable pH in neutraliser=5.1–5.3
pH after evaporation=3.9–4.1
pH at prilling=4.5–4.7

Product prills containing 0.11 to 0.13% H₂O as determined by the Karl Fischer method were produced using the same drying system as was used in examples 1 to 3 but with operating conditions altered so that the residence time of the prills in the drying system was 84 minutes and the amount of drying air used was 6.2 kg air per 1.0 kg of product.

Samples of the prills made according to the processes described in examples 1 to 4 were tested to measure their quality using the following tests:

The hardness of the prills was compared by the following friability test:

It will be appreciated that hardness varies inversely with the friability, i.e., a highly friable material has a low hardness.

An air stream from 11 psig air supply was expanded through a 2.5 mm orifice into a tube of 13 mm internal diameter, which opened into a standard cast iron water pipe elbow of 25 m internal diameter. Prills which were retained by a No 16 BSS sieve were dropped into the air stream 184 mm upstream from the elbow. After they had impinged against the elbow, the prills were collected and the percentage by weight which passed through a No 16 BSS sieve was determined.

The temperature cyclng tests were conducted as follows:

Polyethylene sample bags partly fitted with prills which were retained on a No 16 BSS sieve were temperature cycled 15° C. to 45° C. in six hours by placing them in an oven having a suitable heating and cooling mmechanism to achieve such a temperature pattern. This cycle was repeated four times, so that the prills passed 8 times through this 32° C. transition temperature.

Bulk density is the mass of prills per unit volume of a container which has been filled and levelled without pressure or vibration.

The moisture in the prills was measured by the conventional Karl Fischer test.

The results of these tests on products from examples 1 to 4 are given in Table 1.

TABLE 1

| PRODUCT QUALITY TESTS ON LOW DENSITY AMMONIUM NITRATE PRILLS | | | | |
|---|---|---|---|---|
| Sample from example | 1 | 2 | 3 | 4 |
| Moisture content % H₂O | 0.10 | 0.09 | 0.16 | 0.12 |
| Bulk density (kg/l) | 0.75 | 0.72 | 0.72 | 0.76 |
| pH | 5.4 | 5.0 | 4.9 | 5.2 |
| Friability (% passing No 16 BSS mesh) | 2.0 | 0.6 | 5.4 | 15.0 |
| After temperature cycling | | | | |
| Bulk density (kg/l) | 0.66 | 0.68 | 0.66 | 0.62 |
| Friability (% passing No 16 BSS mesh) | 30 | 19 | 31 | 50 |

EXAMPLE 5

This example illustrates a process according to the invention as it was used to manufacture high density prills. A solution containing between 83% and 85% ammonium nitrate was prepared in a similar manner to that described in example 2 except that the level of addition of aluminium sulphate was 1000 parts (expressed as Al₂O₃) per million parts of ammonium nitrate (expressed as NH₄NO₃). Ammonia was added to give stable pH control in the range 4.6–5.0.

The solution was converted to a melt by evaporation so that the water content was less than 0.08% H₂O. 200 parts of aluminium sulphate (expressed as Al₂O₃) per million parts of ammonium nitrate were added to the melt.

The pH value of a 10% solution of the melt was adjusted to a value in the range of 4.4 to 4.8 by addition of gaseous ammonia to the melt. The melt was then prilled in a conventional prilling tower and cooled by a conventional cooling process. The bulk density of the product was 0.95 kg/l, its pH value was 5.0, the friability was 0.4%, and moisture content between 0.12% and 0.18% H₂O, as determined by the tests previously described.

EXAMPLE 6

By way of comparison a process not according to our invention by which high density prills were made is now described. A solution containing between 83% and 85% ammonium nitrate was prepared in a similar manner to that described in Example 3. Again the minimum stable pH value obtained in the neutraliser was in the range 5.2 to 5.4.

The solution was converted to a melt, prilled and cooled, in a similar manner to that described in Example 5 except that 500 parts of aluminium sulphate (expressed as the Al₂O₃) per million parts of ammonium nitrate were added to the melt.

The bulk density of the product was 0.95 kg/l, its pH value was 5.0, the friability was 0.9% and moisture content was 0.22% to 0.26% H₂O, was determined by the tests previously described.

EXAMPLE 7

By way of comparison a process for making high density ammonium nitrate prills without any aluminium additionis described. High density prills were made according to Example 6 except that no aluminium sulphate was added. The bulk density of the product was 0.95 kg/l, its pH value was 5.6, the friability 3.5% and the moisture content between 0.08% and 0.12% H₂O, as determined by the tests previously described.

Samples from the products of examples 5, 6and 7 were subjected to the temperature cycling test described before. The results are recorded in Table 2.

TABLE 2

| TEMPERATURE CYCLING TESTS ON HIGH DENSITY AMMONIUM NITRATE PRILLS | | | |
|---|---|---|---|
| Sample from example | 5 | 6 | 7 |
| Moisture content % H₂O | 0.15 | 0.24 | 0.10 |
| Bulk density after cycling kg/l | 0.87 | 0.84 | 0.80 |
| Friability after cycling (% passing No 16 BSS mesh) | 12 | 28 | 45 |

EXAMPLE 8

In order to exemplify an embodiment of the process of the invention in which sodium aluminate is added in the second addition an ammonium nitrate concentrate was prepared ina similar manner to that described in Example 2. Sodium aluminate was added to the concentrate in an amount sufficient to provide 1200 parts by weight of aluminium compounds (expressed as Al₂O₃) per million parts by weight of ammonium nitrate, expressed as NH₄NO₃, contained in the concentrate. The pH value of the concentrate on the addition of the sodium aluminate rose to a value in the range from 4.0 to 5.0 thereby eliminating the need for any further ammonia addition to the concentrate before prilling.

EXAMPLE 9

This example illustrates the application of the process of the invention on a manufacturing complex in which several ammonium nitrate containing products are made from one common process stream made by the reaction of ammonia and nitric acid. In the manufacture of low density prills of ammonium nitrate containing 1200 parts by weight of aluminium compounds (expressed as $Al_2O_3$) per million parts by weight of ammonium nitrate product an ammonium nitrate solution is made according to the process of example 3. A portion of this solution is subjected to a preliminary concentration process involving evaporation so that its concentration is increased to 92% w/w ammonium nitrate. The partially concentrated solution is stored at elevated temperature to prevent crystallisation. It is sparged with ammonia to prevent its pH value falling below 4.5. Its pH value varies within the range of 4.5 to 7.0. The partially concentrated solution is transferred to a dosing tank. During this transfer its pH value is adjusted to 4.5 by addition of nitric acid, if necessary. Aqueous aluminium sulphate solution, as described in Example 1, is added to the solution in the dosing tank to provide 720 parts by weight of aluminium compounds (expressed as $Al_2O_3$) per million parts by weight of ammonium nitrate, (expressed as $NH_4NO_3$) in the partially concentrated solution. The pH value of the solution in the dosing tank is maintained between 5.2 and 5.7 by sparging in ammonia.

Solution from the dosing tank is then concentrated by evaporation to yield a concentrate having a fudge point of 118° C., equivalent to a concentration of 94.8% ammonium nitrate.

Aluminium sulphate solution, as desribed in Example 1, is added to the concentrate to bring the total content of alumminium compounds to the desired level of 1200 ppm on the basis already defined. The concentrate is then prilled to give the desired product.

I claim:

1. In a process for the manufacture of prilled or granulating material comprising ammonium nitrate which process comprises a process wherein a solution of ammonium nitrate is made by the reaction of ammonia and nitric acid in a neutraliser, said solution is concentrated by evaporation to the concentration required for prilling or granulating, and the thus formed concentrate is subjected to a prilling or granulating process to form prills or granules which are optionally dried and cooled, the improvement comprising the addition of at least one water soluble aluminium salt to the said solution of ammonium nitrate at any stage before said concentrate is formed.

2. A process according to claim 1 wherein said water soluble aluminium salt is aluminium sulphate.

3. A process according to claim 1 wherein said water soluble aluminium salt is a double salt of aluminium sulphate.

4. A process according to claim 3 wherein said double salt of aluminium sulphate is selected from the group consisting of ammonium aluminium sulphate, sodium aluminium sulphate, potassium aluminium sulphate and mixtures thereof.

5. A process according to claim 1 wherein said water soluble aluminium salt is aluminium nitrate.

6. A process according to claim 1 wherein said water soluble aluminium salt is added to the said solution of ammonium nitrate as an aqueous solution.

7. A process according to claim 1 wherein the said water soluble aluminium salt is added to said solution of ammonium nitrate in an amount greater than 100 parts by weight, expressed as $Al_2O_3$, per million parts by weight of ammonium nitrate, expressed as $NH_4NO_3$, contained in said solution.

8. A process according to claim 7 wherein the said water soluble aluminium salt is added to said solution of ammonium nitrate in an amount sufficient to provide in the said prill or granulated material an amount of aluminium compound in a range from 100 parts to 2000 parts by weight expressed as $Al_2O_3$ per million parts by weight of ammonium nitrate, expressed as $NH_4NO_3$, in the said material.

9. A process according to claim 8 wherein the said amount of water soluble aluminium salt added is sufficient to provide in the said prilled material an amount of aluminium compounds in a range from 800 to 2000 parts by weight expressed as $Al_2O_3$ per million parts by weight of ammonium nitrate, expressed as $NH_4NO_3$, in the said material.

10. A process according to claim 1 wherein, in a first addition, at least one water soluble aluminium salt is added to the said solution of ammonium nitrate prior to the said concentrate being formed and wherein, in a second addition, at least one water soluble aluminium salt is added to the said process stream after said concentrate has been formed.

11. A process according to claim 10 wherein said water soluble aluminium salt used in said second addition is aluminium sulphate.

12. A process according to claim 10 wherein said water soluble aluminium salt used in said second addition is a double salt of aluminium sulphate.

13. A process according to claim 12 wherein said double salt of aluminium sulphate is selected from the group consisting of ammonium aluminium sulphate, sodium aluminium sulphate, potassium aluminium sulphate and mixtures thereof.

14. A process according to claim 10 wherein said water soluble aluminium salt used in said second addition is aluminium nitrate.

15. A process according to claim 10 wherein said water soluble aluminium salt used in said second addition is an aluminate.

16. A process according to claim 15 wherein said aluminate is selected from the group consisting of sodium aluminate, potassium aluminate and mixtures thereof.

17. A process according to claim 10 wherein said water soluble aluminium salt used in the said second addition is added as an aqueous solution to the said process stream.

18. A process according to claim 10 wherein said water soluble aluminium salt added in the said first addition provides at least 20% by weight of the total amount of aluminium compounds in said prilled or granulated material expressed as $Al_2O_3$.

19. A process according to claim 1 wherein the said solution of ammonium nitrate made by the reaction of ammonia and nitric acid has a pH value in the range from 4.2 to 5.5 inclusive.

20. A process according to claim 19 wherein said range of pH values is from 4.6 to 5.0 inclusive.

21. A process according to claim 1 wherein the said process is a continuous process wherein the said solution of ammonium nitrate is made by the continuous addition of ammonia and nitric acid to a preformed solution of ammonium nitrate contained in a neutraliser.

22. A process according to claim 21 wherein said preformed solution of ammonium nitrate has a pH value in the range from 4.2 to 5.5 inclusive.

23. A process according to claim 22 wherein said preformed solution of ammonium nitrate has a pH value in the range from 4.6 to 5.0 inclusive.

24. A process according to claim 1 wherein said water soluble aluminium salt is added to the said neutraliser.

25. A process according to claim 21 wherein said preformed solution of ammonium nitrate contains aluminium compounds and wherein at least one water soluble aluminium salt is continuously added to the said preformed solution of ammonium nitrate.

26. A process according to claim 24 wherein the said aluminium compounds are present in amounts in the range 100 to 200 parts by weight, expressed as $Al_2O_3$, per million parts by weight of ammonium nitrate, expressed as $NH_4NO_3$, in the said preformed solution of ammonium nitrate.

27. In a process for the manufacture of prilled or granulated material comprising ammonium nitrate which process comprises, as stages, manufacture of a solution of ammonium nitrate by the reaction of ammonia and nitric acid in a neutraliser, concentration of said solution by evaporation to the concentration requied for prilling or granulating, and subjecting the thus formed concentrate to a prilling or granulation process to form prills or granules which are optionally dried and cooled, the said improvement comprising the addition of at least one water soluble aluminium salt to the said solution of ammonium nitrate during the concentration stage.

* * * * *